Patented July 15, 1952

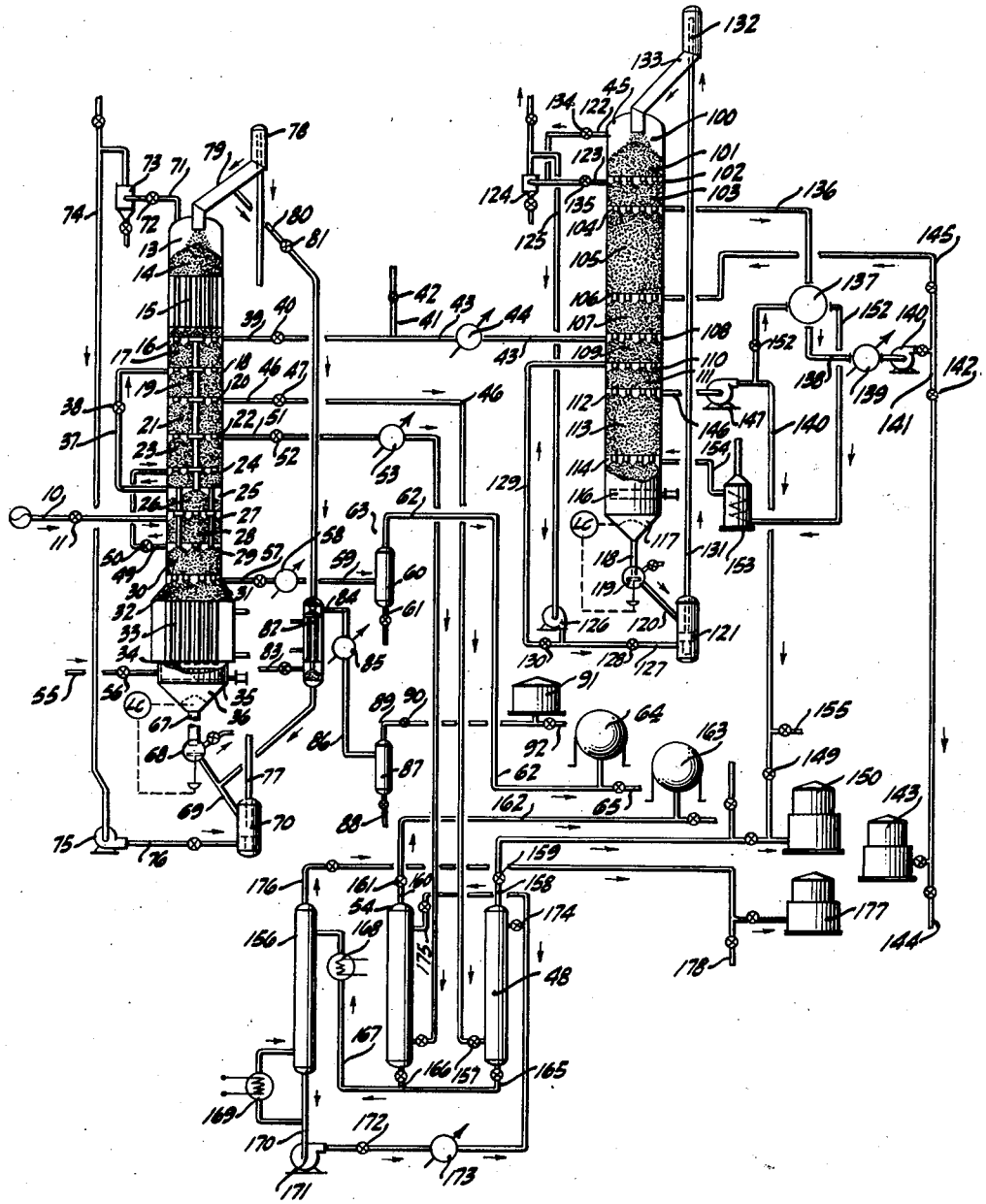

2,603,553

UNITED STATES PATENT OFFICE 2,603,553

ADSORPTION PROCESS

Clyde H. O. Berg, Long Beach, Calif., assignor to Union Oil Company of California, Los Angeles, Calif., a corporation of California Application April 21, 1949, Serial No. 88,823

20 Claims. (Cl. 23—3)

This invention relates to a continuous process for the separation of a gaseous mixture by contact with a moving bed of solid granular adsorbent and in particular relates to an improved process which is specifically adaptable to the separation of multicomponent gaseous mixtures such as mixtures of hydrocarbon gases which contain inorganic ingredients. The process permits the ready separation of the hydrocarbon constituents and the inorganic constituents such as helium, hydrogen, carbon monoxide, carbon dioxide, hydrogen sulfide and others in substantially pure form.

It is a primary object of the present invention to provide a continuous economical process for the treatment of multicomponent gaseous mixtures by continuous selective adsorption.

A more specific object of this invention is to provide a process for the separation of multicomponent hydrocarbon gas mixtures which contain one or more inorganic constituents and which may also contain acidic gases.

It is another object of this invention to provide an adsorption process for the separation of carbon dioxide and/or hydrogen sulfide from multicomponent mixtures of hydrocarbon gases to produce an ethane-carbon dioxide fraction and a propane-hydrogen sulfide fraction.

An additional object of this invention is to provide a process whereby efficient separation of fixed gases including nitrogen, helium, hydrogen, carbon monoxide, and the like, may be efficiently separated from multicomponent hydrocarbon gas mixtures.

Another object of this invention is to provide a combination process in which two actively cofunctioning continuous adsorption steps are performed on a multicomponent hydrocarbon gas mixture to separate nitrogen and fixed gases therefrom while employing the least possible quantity of granular adsorbent.

Another object of this invention is to provide an apparatus adaptable to carrying out the aforementioned objects.

Other objects and advantages of this invention will become apparent to those skilled in the art as the description thereof proceeds.

More specifically the present invention comprises a combination process employing two continuous selective adsorption columns in which moving beds of solid granular adsorbents are employed to contact and separate multicomponent gaseous mixtures. In the first adsorption column the moving bed of adsorbent is divided into two separate streams which are independent of one another and are subsequently combined in the lower portion of the column and recirculated to the top of the column as one stream. The feed gas to be separated is first contacted with one portion of the moving bed of adsorbent and the unadsorbed constituents from the first contact are separated from that portion of the adsorbent and are subsequently contacted with the second stream of adsorbent to effect a further separation. In this manner, and as more fully described hereinafter, the feed gas mixture may be separated into four substantially pure fractions, each of which is uncontaminated by constituents desired in any of the other fractions. The gas stream of least adsorbability from this first adsorption column is passed directly to the second adsorption column wherein a further separation is effected. Since this process is primarily directed to the separation of multicomponent hydrocarbon gas mixtures in which it has been found that the lighter constituents may be more readily separated in the absence of the heavier constituents, an active cooperation exists between the two adsorption operations which permits advantages to be realized in the form of decreased pressures of operation.

The present invention in a narrower sense also comprises a combination of two adsorption steps with further processing steps by means of which intermediate fractions from the first adsorption step containing an acidic gas and a hydrocarbon gas are subsequently separated therefrom to produce uncontaminated hydrocarbon fractions. It has been found that in the separation of multicomponent hydrocarbon gas mixtures that acidic constituents such as hydrogen sulfide and carbon dioxide may be separated therefrom with certain of the hydrocarbon constituents and although their boiling points are different, their degrees of adsorbability have been shown to be quite similar. Specifically it has been found that carbon dioxide is adsorbed on certain adsorbents; namely, activated vegetable charcoal, to approximately the same degree as are ethane and ethylene and that hydrogen sulfide is adsorbed and desorbed to approximately the same degree as are propane and propylene. Thus, in the first selective adsorption step of the combination process methane and the lighter fixed gases including nitrogen, carbon monoxide, hydrogen, helium and the like, are removed as a substantially unadsorbed overhead lean gas product. Carbon dioxide, ethane and any ethylene if present are separated as a first side cut product while hydrogen sulfide is separated with propylene and propane as a second side cut product. Higher molecular weight constituents are removed as a bottoms or rich gas product. Many natural gas fields product gases rich in carbon dioxide and hydrogen sulfide, which are desirable chemical raw materials. It has been found that these gaseous mixtures may be produced in a form of high purity in which substantially none of the constituents normally present in one gas product will appear as a contaminant in another.

The first and second side cut gas products are subsequently conducted in separate streams to separate extraction columns in which the hydrocarbon constituents and the acidic constituents are separated by washing the gases with a suitable alkaline reacting solvent. The preferred form of this solvent has been found to be aqueous solutions of diethanolamine, although other well known organic and inorganic solvents such as the other alkanol amines and the like, aqueous solutions of alkali metal carbonate, bicarbonates, and hydroxides, may be employed. Separate streams of carbon dioxide and hydrogen sulfide may be produced if desired by separately treating the rich solvents obtained in the two extraction steps, or the rich solvents may be combined and stripped together to produce a mixture of hydrogen sulfide and carbon dioxide.

A drawing which shows a schematic flow diagram of the process of the present invention including the first and second adsorption steps as well as the extraction steps is shown to facilitate the description and illustration of the present invention. The description of this drawing will be conducted in the form of a practical example in which temperatures, pressures, flow rates and stream compositions are given.

The feed gas to be separated is available at 80° F., 500 pounds per square inch gauge pressure and flows at a rate of 70,000,000 standard cubic feet per day. It is a multicomponent hydrocarbon mixture contaminated with nitrogen, carbon dioxide, and hydrogen sulfide. The analysis of the feed gas is given below:

TABLE

*Feed gas analysis*

| Constituent | Mol Per Cent |
|---|---|
| Nitrogen | 27.5 |
| Methane | 57.9 |
| Carbon Dioxide | 6.4 |
| Ethane | 4.0 |
| Hydrogen Sulfide | 0.1 |
| Propane | 2.6 |
| i-butane | 0.25 |
| n-butane | 0.75 |
| i-pentane | 0.14 |
| n-pentane | 0.16 |
| $C_6+$ | 0.20 |
| Total | 100.00 |

Referring now more particularly to the drawing the feed gas to be separated is introduced via line 10 at a rate of 70,000,000 cubic feet per day controlled by valve 11 into first selective adsorption column 12. This particular selective adsorption column is a type which is more clearly described in specific detail and claimed in copending application, Serial No. 76,312, filed February 14, 1949.

This selective adsorption column is provided at successively lower levels with elutriation zone 13, hopper 14, cooling zone 15, lean gas disengaging zone 16, secondary adsorption zone 17, secondary feed gas engaging zone 18, first side cut gas rectification zone 19, first side cut disengaging zone 20, second side cut rectification zone 21, second side cut disengaging zone 22, second side cut desorption zone 23, primary reflux gas engaging zone 24, secondary feed gas disengaging zone 25, primary adsorption zone 26, feed gas engaging zone 27, primary rectification zone 28, secondary reflux disengaging zone 29, secondary rectification zone 30, rich gas disengaging zone 31, preferential desorption zone 32, indirect heating or stripper zone 33, stripping gas engaging zone 34, adsorbent feeder zone 35, and bottom zone 36. Zones 17—24 inclusive, comprise a first separation zone and zones 25—29 comprise a second separation zone through each of which is passed a separate and independent stream of adsorbent, each stream flowing at the rate of 136,000 pounds per hour. In the preferred modification the adsorbent is activated vegetable charcoal having a mesh size of about 12 to 30.

The feed gas mixture passes upwardly through primary adsorption zone 26 wherein the nitrogen, methane, carbon dioxide and ethane only remain unadsorbed. These unadsorbed gases comprise a secondary feed gas which is removed from zone 25 via line 37 at a rate of about 67,000,000 standard cubic feet per day controlled by valve 38 and is introduced via zone 18 into secondary adsorption zone 17. Herein the carbon dioxide and ethane is adsorbed leaving the nitrogen and methane substantially unadsorbed as a lean gas. A portion of this is passed as a purge gas upwardly through the tubes of cooling zone 15 while the remainder is removed from lean gas disengaging zone 16 via line 39 controlled by valve 40 at a rate of 60,980,000 standard cubic feet per day. This gas has a molecular weight of 20.4 and is at a temperature of 110° F. and a pressure of 485 pounds per square inch gauge. If desired, a portion of this gaseous mixture may be removed as such via line 41 controlled by valve 42 and sent to further processing or storage facilities not shown. However, in the preferred modification this gaseous mixture is passed via line 43 through cooler 44 into selective adsorption column 45 which will subsequently be described.

The adsorbent passing into zone 21 is contacted therein with a second side cut gas reflux containing propane and hydrogen sulfide which are preferentially adsorbable and thereby cause a desorption of the first side cut gas product containing ethane and carbon dioxide. A portion of this gas passes into zone 19 as reflux and is ultimately removed from zone 20 via line 46 at a rate of 5,950,000 standard cubic feet per day controlled by valve 47. This gas is a mixture of ethane and carbon dioxide, has a molecular weight of 36.6 and is at a temperature of 120° F. and a pressure of 490 pounds per square inch gauge. This gas is passed via line 46 and is introduced into second extraction column 48 wherein the carbon dioxide is separated in an operation which will be described subsequently.

The rich adsorbent passing into zone 30 of adsorption column 12 is contacted with a reflux gas containing $C_4$ and higher molecular weight hydrocarbons causing the desorption of a primary reflux gas containing some $C_4$ hydrocarbons and rich in propane and hydrogen sulfide. This gas passes via line 49 at a rate controlled by valve 50 into zone 24. The $C_4$ and higher molecular weight constituents are adsorbed in zone 23, a substantially pure mixture of propane and hydrogen sulfide is removed from zone 22 via line 51 controlled by valve 52 at a rate of 1,860,000 standard cubic feet per day. This gas has a molecular weight of 43.8 and is removed at a temperature of 210° F. and 490 pounds per square inch gauge pressure. It is passed through cooler 53 wherein a liquid phase forms and is subsequently introduced into first extractor 54 to separate hydrogen sulfide from propane in an operation described below.

The rich adsorbent passing through heater 33 of adsorption column 12 is heated to a temperature of 500° F. and is contacted with stripping steam introduced via line 55 at a rate of 20,100 pounds per hour controlled by valve 56. The $C_4$ hydrocarbons and some higher molecular weight hydrocarbons are desorbed thereby, part of which are employed as reflux in zone 30 while the remainder are removed from zone 31 via line 57 at a rate of 665,000 standard cubic feet per day in addition to the stripping steam. This gas is passed through rich gas cooler 58 wherein the stripping steam is condensed and then via line 59 into separator 60 wherein the condensed stripping steam and liquefied $C_4$ hydrocarbons are separated. The condensed steam is withdrawn via line 61 and the butanes pass via line 62 at a rate controlled by valve 63 into butane storage tank 64, or may be sent to further processing facilities not shown via line 65.

The hot adsorbent passing from heater 33 still contains adsorbed $C_5$ and $C_6$ hydrocarbon constituents but is substantially free of $C_4$ hydrocarbons. The adsorbent then flows from bottom zone 36 through sealing leg 67, adsorbent flow control valve 68, transfer line 69 into induction zone 70. A lift gas is removed from the elutriation zone 13 via line 71 controlled by valve 72, passed through separator 73 to remove suspended adsorbent fines and thence via line 74 under the influence of lift gas blower 75 through line 76 into induction zone 70. The adsorbent is suspended in the lift gas and passed upwardly via lift line 77 into impactless separator 78 wherefrom the separated adsorbent and lift gas pass as substantially independent phases via transfer line 79 into elutriation zone 13. A portion of the adsorbent thus passing through transfer line 79 is removed therefrom via line 80 controlled by valve 81 and is passed through high temperature reactivator 82 wherein this portion of the adsorbent is heated to between 1000° F. and 1100° F. at which temperature it is contacted with stripping steam introduced via line 83. In this manner substantially all of the $C_5$ and $C_6$ hydrocarbon constituents are desorbed and are removed therefrom via line 84 at a rate of 545,000 standard cubic feet per day at a temperature of 475° F. and a pressure of 495 pounds per square inch gauge. Periodically the temperature of operation is raised to between 1700° F. and 1800° F. for short periods of time to reactivate the adsorbent which, if charcoal, is by partial gasification. This material is cooled and condensed in cooler 85 and passed via line 86 into separator 87 wherein the material is separated from the stripping steam. The aqueous condensate is withdrawn via line 88 and the gasoline fraction is passed via line 89 controlled by valve 90 into gasoline storage 91 or sent via line 92, if desired, to further processing facilities not shown.

Referring now more particularly to the lean gas product removed from zone 16 of column 12, the nitrogen and methane constituents of this gas mixture could have been separated in column 12. However, it has been found that the separation of methane from nitrogen is facilitated by the absence of $C_2$ and heavier hydrocarbons. Consequently first separating $C_2$ and heavier hydrocarbons from methane and nitrogen and subsequently separating the $C_1$ from nitrogen, lower adsorbent flow rates are permitted in both columns than would otherwise have been possible. The reason for this is not exactly understood. However, it is believed to be caused by the ethane in the adsorbed phase of the adsorbent exerting a decrease on the relative volatility of nitrogen with respect to methane. Consequently the operation of selective adsorption column 45 is considerably simplified by the absence of $C_2$ hydrocarbons in the nitrogen-methane mixture introduced into column 45 via line 43.

The second selective adsorption column in the combination process is column 45 and is the type more clearly described and claimed in copending application Serial No. 77,556, filed February 21, 1949. In this column, part of the overhead gas product is recirculated as a lean gas recycle through the upper part of the column to cool the adsorbent passing therethrough. Simultaneously a portion of the rich gas product is recirculated through the lower part of the column to heat the adsorbent flowing therethrough and this rich gas recycle is brought into heat exchange relationship with the lean gas recycle at a point outside the column. Since the pressure is high the recirculated gases are dense allowing them to be used efficiently as heat transfer media.

Selective adsorption column 45 is provided with elutriation zone 100, hopper 101, purge gas disengaging zone 102, purging zone 103, lean gas recycle disengaging zone 104, cooling zone 105, lean gas recycle engaging zone 106, adsorption zone 107, feed gas engaging zone 108, secondary adsorption zone 109, lift gas recycle engaging zone 110, rectification zone 111, rich gas recycle disengaging zone 112, desorption zone 113, rich gas engaging zone 114, absorbent feeder zone 116, and bottom zone 117. The adsorbent moves downwardly through these zones by gravity as a substantially compact moving bed. It is removed from bottom zone 117 via sealing leg 118 and passes via adsorbent flow control valve 119 and transfer line 120 into induction zone 121. Lift gas removed from the upper portion of the column by either of lines 122 or 123 is removed from separator 124 via line 125, and by means of blower 126 is passed partly via line 127 controlled by valve 128 into induction zone 121 and the remainder passes via line 129 controlled by valve 130 into secondary adsorption zone 109. The reason for recirculating part of the lift gas in this manner is to return to the adsorption zone that portion of methane desorbed in the purging zone 103 by the action of that part of the lean gas recycle known as the "purge gas" which passes therethrough. There is no stripping gas employed in this column and incomplete stripping results. The adsorbent passing downwardly through the purging zone is stripped of most of the remaining ethane by the action of the purge gas which, in order to effect efficient separations is returned to a secondary adsorption zone for readsorption of a methane.

The adsorbent passed into induction zone 121 is conveyed via lift line 131 to impactless separator 132 wherefrom the separated adsorbent and lift gas pass via line 133 into elutriation zone 100. The lift gas passes primarily from this zone via line 122 controlled by valve 134 and is combined with purge gas removed from the column via line 123 controlled by valve 135. Adsorbent fines are separated from the lift gas in separator 124 and suitably disposed of.

The lean gas consists of pure nitrogen which is unadsorbed in adsorption zone 107, passes upwardly through zones 107 and 105 and is removed therefrom via line 136 at a temperature of 585° F. at a pressure of 478 pounds per square inch gauge. This portion of lean gas in then passed through recycle gas interchanger 137 wherein it is cooled to 300° F. and subsequently via line 138 through cooler 139 wherein it is cooled to 120° F. The cool gas is then pumped by blower 140 partly through line 141 at a rate of 14,500,000 standard cubic feet per day controlled by valve 142 to storage tank 143 or to further processing facilities not shown via line 144 and the remaining portion is passed via line 145 at a rate of 195,000,000 standard cubic feet per day. This gas is removed from the cooler at a temperature of 585° F. and is introduced into the cooler at a temperature of 120° F. thus cooling 1,260,000 pounds per hour of adsorbent circulated through column 45.

In passing the feed gas through zone 107 the methane is adsorbed in the absence of higher molecular weight hydrocarbons and passes on the adsorbent into secondary adsorption zone 109 wherein further quantities of methane are adsorbed from the lift gas introduced as above described. The adsorbent then passes through rectification zone 111 wherein remaining traces of nitrogen are desorbed so that the adsorbent entering heating zone 113 is substantially free of nitrogen. In zone 113 the adsorbent is heated from a temperature of about 150° F. to approximately 600° F. thereby desorbing the adsorbed methane to form a rich gas which is removed at about 160° F. This rich gas passes via line 146 by means of blower 147. Part of the rich gas thus removed passes via line 148 controlled by valve 149 at a rate of 42,200,000 standard cubic feet per day into methane storage tank 150. It may be also combined with ethane from which the carbon dioxide has been removed in extraction column 48. The remaining portion of the rich gas thus removed is passed via line 151 controlled by valve 152 through recycle gas interchanger 137. Herein the temperature of the rich gas recycle is raised from 160° F. to 430° F. The thus heated gas subsequently passes via line 152 into rich gas recycle heater 153 wherein the temperature is raised to 600° F. and passed via line 154 directly into heating zone 113. The rich gas recycle employed for heating the adsorbent is recirculated at a rate of 303,000,000 standard cubic feet per day. The lean gas recycle has a molecular weight of 28.0 and comprises substantially pure nitrogen while the rich gas methane recycle has a molecular weight of 17.2 and contains about 10% nitrogen.

If desired, part of the methane may be passed via line 155 to further processing facilities not shown.

Referring now to the lower part of the drawing, two extraction columns 48 and 54 are shown operating in conjunction with a solvent still 156. The purpose of extraction column 48 is to remove carbon dioxide present in the ethane side cut from the selective adsorption column 12. To do this the ethane side cut introduced via line 46 controlled by valve 157 passes upwardly through column 48 countercurrent to an alkaline solvent consisting in this modification of a downward flow of 372,000 pounds per hour of a 30% aqueous solution of diethanolamine. Such alkaline solvents as aqueous solutions of such basically reacting inorganic salts as alkali metal carbonates, bicarbonates, and hydroxides may be used as well as the well known amine solvents which are preferred since they are regeneratable with heat. The countercurrent extraction removes carbon dioxide from the ethane which subsequently passes via line 158 controlled by valve 159 to further processing facilities not shown via line 160 or it may be mixed with methane from selective adsorption column 45 and stored in gas holder 150. The ethane stream thus formed is removed from column 48 at a pressure of 485 pounds per square inch and at a temperature of 120° F. The flow rate of the stream is 2,290,000 standard cubic feet per day.

Extraction column 54 countercurrently contacts 1,860,000 standard cubic feet of a mixture of propane and hydrogen sulfide with 4,210 pounds per hour of a 30% aqueous solution of diethanolamine. A stream of hydrogen sulfide free of propane is removed from extraction column 54 via line 160 at a rate of 8950 pounds per hour, controlled by valve 161. This is a stream of liquid propane which passes through a drier not shown and then through line 162 either into propane storage vessel 163 or via line 164 to further processing facilities not shown.

The rich solvent formed in extraction columns 48 and 54 is removed therefrom, respectively, via lines 165 and 166 and are combined and passed via line 167 through heater 168 into solvent still 156. Heat is supplied to the bottom column 156 by means of reboiler 169 wherein the diethanolamine solution is boiled forming vapors to strip the acidic constituents from the rich solvent. The stripped solvent passes via line 170 through pump 171 at a rate of 376,210 pounds per hour controlled by valve 172 through lean solvent cooler 173 and subsequently via lines 174 and 175 into extraction columns 48 and 54, respectively. A mixture of hydrogen sulfide and carbon dioxide is removed from solvent still 156 at a rate of 4,500,000 standard cubic feet per day through line 176 and is sent to storage vessel 177 or to further processing facilities not shown via line 178. In a preferred modification these gases are combined with nitrogen flowing through line 144 and are vented to the atmosphere as waste gases.

In a preferred application, the process described and illustrated above is employed as a "cycling plant" in which the feed gas comprises natural gas, from which desirable hydrocarbons are adsorbed and the lighter gases are passed through an injection well into the gas field. Natural gases containing desirable hydrocarbons, $C_3$–$C_6+$, as well as carbon dioxide and hydrogen sulfide are especially easily treated in this way.

In another example of the operation of the process of this invention, a gaseous mixture having the following composition:

| Constituent | Mol Per Cent |
|---|---|
| Hydrogen | 14.0 |
| Nitrogen | 34.6 |
| Carbon Monoxide | 17.3 |
| Carbon Dioxide | 16.8 |
| Hydrogen Sulfide | 17.3 |
| Total | 100.0 | was treated at a rate of 3700 M. S. C. F. per day with two streams of 27,000 pounds per hour each of activated charcoal in a column similar to column 12 in the drawing. A lean gas product comprising hydrogen, nitrogen and carbon monoxide, a side cut product containing carbon dioxide and a rich gas product containing hydrogen sulfide were produced. The product streams have the following composition:

| Constituents | Mol Per Cent | | |
|---|---|---|---|
| | Lean Gas | Side Cut Gas | Rich Gas |
| Hydrogen | 21.1 | | |
| Nitrogen | 52.2 | 1.0 | |
| Carbon Monoxide | 26.1 | 0.5 | |
| Carbon Dioxide | 0.6 | 97.2 | 2.7 |
| Hydrogen Sulfide | | 1.3 | 97.3 |
| Total | 100.0 | 100.0 | 100.0 |
| Flow Rate MSCF/day | 2,430 | 626 | 644 |

In this operation only one side cut product was produced. The lean gas product consisted of 99.4% of the desired constituents.

In this operation hydrogen sulfide is employed as the reflux gas to desorb the carbon dioxide forming the side cut gas product. Smooth operation and efficient separation resulted.

In another operation, a feed gas having a composition approximating that given above together with 18% methane was separated in a two-stage operation in which methane was separated from hydrogen, nitrogen and carbon monoxide in the second selective adsorption zone.

The recovery of argon concentrates may be effected in the selective adsorption process from gases containing this element. In one operation, a feed gas having the following composition:

| Constituent | Mol Per Cent |
|---|---|
| Hydrogen | 57.8 |
| Nitrogen | 25.2 |
| Methane | 17.0 |
| Argon | |
| Total | 100.0 | was contacted with activated charcoal according to this invention to form the following products:

| Constituent | Mol Per Cent | |
|---|---|---|
| | Lean Gas | Rich Gas |
| Hydrogen | 75.0 | |
| Nitrogen | 25.0 | 25.4 |
| Methane | | 74.6 |
| Argon | | |
| Total | 100.0 | 100.0 |

The lean gas was subsequently separated to produce substantially pure hydrogen and nitrogen and the argon separated from the methane. This may be done in several ways including a combustion step although the preferred way is by selective adsorption in which argon is produced as the unadsorbed lean gas and methane as the rich gas product.

The foregoing has been a description of a particular embodiment of the present invention as applied to the continuous processing of a multicomponent mixture of hydrocarbon gases contaminated both with acidic constituents in the form of hydrogen sulfide and carbon dioxide as well as nearly 30% of nitrogen. In the present invention it has been found that by treating such a gaseous mixture in a two-stage selective adsorption operation an efficient and economical recovery of the desired constituents may be made. The foregoing description and illustration is not intended as a limitation of the present invention to the treatment of the gaseous mixture used in the illustration since multicomponent mixtures other than the type disclosed have been found to be readily separated when treated according to the process described. This is true of gaseous mixtures containing hydrocarbons together with such other inorganic constituents as carbon monoxide, hydrogen, helium, nitrogen, and oxygen either alone or together as well as gaseous mixtures containing no hydrocarbon constituents.

Adsorbent charcoal has been disclosed as the preferred adsorbent, however, other well known adsorbents which may be employed in the process include silica and other gels, aluminum oxide, activated bauxite, and other adsorbent metal oxides such as iron, chromium, and the like. Mesh sizes of adsorbent which are applicable range from 2 to as high as 100 mesh although 12 to 20 or 30 mesh sizes are preferred.

The present process is further not to be limited to pressures of operation of about 500 pounds per square inch as shown in the example because the process is operable over wide pressure ranges of from below atmospheric to as high as 2000 to 3000 pounds per square inch as used in natural gas cycling plants. The pressure of operation is usually largely dictated by the pressure at which the gas is available.

If desired the second adsorption column in the combination (column 45 on the drawing) may be modified to incorporate a tubular cooling zone and heating zone where the operating pressures are sufficiently low to prevent recycled gases from having specific heats which are high enough to warrant recycle gas heat exchange. Pressures below about 250 pounds per square inch would warrant such a change for the gas separation shown.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A process for the separation of a gaseous mixture containing at least one extractable constituent having the same degree of adsorbability as one other constituent of said gaseous mixture which comprises contacting said mixture with a first moving bed of lean solid granular adsorbent to adsorb constituents of greatest adsorbability forming a first rich adsorbent leaving constituents of intermediate and least adsorbability substantially unadsorbed as a secondary feed gas, subsequently contacting said secondary feed with a second moving bed of solid granular adsorbent to form a second rich adsorbent containing adsorbed constituents of intermediate adsorbability leaving constituents of least adsorbability as a substantially unadsorbed first product, contacting said second rich adsorbent with a reflux gas containing the constituent of greatest adsorbability thereby desorbing a gas containing the constituent of intermediate adsorbability as a second product gas, subsequently desorbing said constituent of greatest adsorbability from the combined first and second moving beds of said adsorbent to form said reflux and a third product gas and a lean adsorbent, and extracting with an extraction solvent said extractable constituent from at least one of said product gases.

2. A process for the separation of gas mixtures containing at least four fractions having different degrees of adsorbability and at least one extractable contaminant of the same degree of adsorbability as another constituent of said gaseous mixture which comprises circulating two independent streams of solid granular adsorbent downwardly through a selective adsorption zone as substantially compact moving beds, contacting the first of said streams with said gaseous mixture to adsorb the two more readily adsorbable fractions forming a first rich adsorbent and leaving a substantially unadsorbed secondary feed gas containing the two less readily adsorbable fractions, separating said secondary feed from said first stream of adsorbent, contacting said second stream of adsorbent with said secondary feed forming a second rich adsorbent containing the more readily adsorbable fraction thereof leaving the less readily adsorbable fraction thereof unadsorbed as a lean gas product, contacting said second rich adsorbent with one of the more readily adsorbable fractions to desorb the most readily adsorbable fraction of said secondary feed as a first side cut gas product leaving a partially rectified adsorbent, subsequently contacting said partially rectified adsorbent with the two most readily adsorbable fractions of said gaseous mixture thereby leaving the next less readily adsorbable fraction as a second side cut gas product, subsequently combining said first and second streams of adsorbent, desorbing the most readily adsorbable fraction from the combined adsorbent streams and extracting said extractable contaminant with an extraction solvent from at least one of said product gases.

3. A process for the separation of a gaseous mixture of hydrocarbons containing carbon dioxide and hydrogen sulfide as contaminants which comprises contacting said gaseous mixture with a first moving bed of solid granular adsorbent to adsorb hydrogen sulfide, $C_3$ hydrocarbons and the more readily adsorbable constituents thereof forming a rich adsorbent and leaving carbon dioxide, $C_2$ hydrocarbons and less readily adsorbable constituents as a substantially unadsorbed secondary feed, contacting said secondary feed with a second moving bed of adsorbent leaving methane and less readily adsorbable constituents as an unadsorbed product gas, first preferentially desorbing from said second moving bed of solid granular adsorbent a first side cut fraction containing $C_2$ hydrocarbons and carbon dioxide, next preferentially desorbing from said second moving bed of solid granular adsorbent a second side cut fraction containing $C_3$ hydrocarbons and hydrogen sulfide, combining said first and second moving beds of adsorbent, desorbing remaining constituents as a rich gas product from the combined beds of adsorbent leaving a lean adsorbent, recirculating said lean adsorbent to contact further quantities of said gaseous mixture and said secondary feed and contacting each of said side cut fractions with an extraction solvent to extract carbon dioxide and hydrogen sulfide respectively therefrom leaving substantially pure $C_2$ hydrocarbons and $C_3$ hydrocarbons as product streams.

4. A process for the separation of hydrocarbon gas mixtures containing carbon dioxide which comprises contacting said gaseous mixture with a substantially compact first moving bed of solid granular adsorbent to adsorb the $C_3$ and higher molecular weight hydrocarbons forming a rich adsorbent and leaving $C_2$ hydrocarbon, carbon dioxide and less readily adsorbable constituents as a substantially unadsorbed secondary feed gas, contacting said secondary feed with a second moving bed of adsorbent to adsorb $C_2$ hydrocarbons and carbon dioxide leaving an unadsorbed gas containing methane and less readily adsorbable constituents, contacting said second bed of adsorbent with a reflux gas thereby desorbing $C_2$ hydrocarbons and carbon dioxide as a second gas product, recirculating the adsorbent stripped of adsorbed constituents to contact further quantities of said gaseous mixture, separating said carbon dioxide from said $C_2$ hydrocarbons by contacting said second gas product with an alkaline solvent leaving substantially pure $C_2$ hydrocarbons and separating the carbon dioxide substantially free of hydrocarbons from said solvent.

5. A process for the separation of hydrocarbon gas mixtures containing hydrogen sulfide which comprises contacting said gaseous mixture with a substantially compact first moving bed of solid granular adsorbent thereby adsorbing said hydrogen sulfide together with $C_3$ hydrocarbons and more readily adsorbable constituents leaving $C_2$ hydrocarbons and less readily adsorbable constituents substantially unadsorbed, subsequently desorbing $C_3$ hydrocarbons and more readily adsorbable constituents together with hydrogen sulfide from said adsorbent, contacting this desorbed gas with a second moving bed of adsorbent leaving $C_3$ hydrocarbons and hydrogen sulfide substantially unadsorbed as a product gas, recirculating the adsorbent stripped of adsorbed constituents to contact further quantities of said gaseous mixture, separating said hydrogen sulfide from said $C_3$ hydrocarbons by contacting the product gas with an alkaline solvent leaving $C_3$ hydrocarbons substantially unextracted and separating hydrogen sulfide substantially free of hydrocarbons from said solvent.

6. A process for the separation of hydrogen sulfide and carbon dioxide from gaseous mixtures of hydrocarbons which comprises recirculating two separate streams of solid granular adsorbent as moving beds flowing by gravity through first and second separation zones, introducing said gaseous mixture into said first separation zone thereby adsorbing $C_4$ and more readily adsorbable hydrocarbon constituents leaving the less readily adsorbable constituents substantially unadsorbed as a secondary feed gas, separating said secondary feed gas from said first separation zone, introducing it into said second separation zone to contact a separate moving bed of adsorbent thereby adsorbing $C_2$ and $C_3$ hydrocarbons together with hydrogen sulfide and carbon dioxide leaving methane and less readily adsorbable constituents unadsorbed as a lean gas product, contacting said adsorbent with a reflux gas containing $C_3$ hydrocarbons and hydrogen sulfide thereby desorbing $C_2$ hydrocarbons and carbon dioxide as a first side cut gas product, combining the two separate streams of adsorbent, contacting the combined stream with most readily adsorbable hydrocarbon constituents thereby desorbing $C_3$ and $C_4$ hydrocarbons and hydrogen sulfide as a primary reflux gas, passing said primary reflux gas into said second separation zone to desorb $C_3$ hydrocarbons and hydrogen sulfide as a second side cut product, indirectly heating the combined adsorbent while directly contacting the same with a countercurrent flow of stripping gas thereby desorbing $C_4$ and higher molecular weight hydrocarbons as a rich gas product leaving a hot lean adsorbent, recirculating said lean adsorbent through a cooling zone prior to dividing the adsorbent into said two streams to contact further quantities of said gaseous mixture, contacting said first and second side cut products with streams of an alkaline solvent to extract carbon dioxide and hydrogen sulfide respectively therefrom leaving $C_2$ and $C_3$ hydrocarbons respectively unextracted as product gases and separating carbon dioxide and hydrogen sulfide from said alkaline solvents.

7. A process according to claim 6 wherein said solid granular adsorbent comprises granular vegetable charcoal and said stripping gas comprises steam.

8. A process according to claim 7 wherein a portion of the adsorbent circulated through said selective adsorption zone is separated from the main recirculating stream, it is heated to a temperature just below the temperature required for a water-gas reaction thereby desorbing residual $C_4$ and higher molecular weight hydrocarbons forming a reactivated adsorbent, and the adsorbent is combined subsequently with the main recirculating stream of adsorbent.

9. A process according to claim 8 wherein the temperature to which the adsorbent is heated in said reactivation zone is periodically raised to a temperature above that at which the water-gas reaction occurs for a sufficient period of time to increase the adsorptive capacity of the adsorbent circulated through said selective adsorption zone and is then lowered to a temperature which is insufficient to cause the water-gas reaction but sufficient to desorb $C_4$ and higher molecular weight hydrocarbons.

10. A process for the continuous separation of hydrocarbon gas mixtures containing nitrogen and at least one extractable constituent having substantially the same degree of adsorbability as a hydrocarbon in said mixture which comprises contacting said gaseous mixture with a first moving bed of solid granular adsorbent to adsorb $C_2$ and more readily adsorbable constituents leaving methane, nitrogen and less readily adsorbable constituents as a substantially unadsorbed gas, subsequently contacting said substantially unadsorbed gas with a second separate moving bed of solid granular adsorbent to adsorb methane leaving nitrogen and any less readily adsorbable constituents as a second substantially unadsorbed product gas, desorbing methane as a product gas from said second moving bed of adsorbent in the absence of $C_2$ hydrocarbons and more readily adsorbable constituents, subsequently desorbing $C_2$ hydrocarbons as a product gas from said first moving bed of adsorbent forming a partially rectified adsorbent, desorbing the remaining hydrocarbons from said partially rectified adsorbent as a product gas leaving a lean adsorbent, separating the extractable constituents from at least one of said product gases by contacting said gas with an extraction solvent leaving a hydrocarbon product unextracted and separating said extracted constituent from said solvent.

11. A process for the separation of substantially pure carbon dioxide from gaseous mixtures of hydrocarbons which comprises contacting said gaseous mixtures with a first moving bed of granular charcoal to adsorb more readily adsorbable constituents leaving carbon dioxide and $C_2$ hydrocarbons and less readily adsorbable constituents unadsorbed, contacting the unadsorbed gas with a second moving bed of charcoal to adsorb carbon dioxide and $C_2$ hydrocarbons leaving methane substantially unadsorbed, desorbing carbon dioxide and $C_2$ hydrocarbons from said second moving bed of charcoal, contacting the thus desorbed gas with an aqueous solution of diethanolamine thereby extracting carbon dioxide and leaving said $C_2$ hydrocarbons unextracted, combining said methane with said $C_2$ hydrocarbons, and recovering carbon dioxide in a state of high purity from said aqueous solution.

12. A process for the separation of substantially pure hydrogen sulfide from gaseous mixtures of hydrocarbons which comprises contacting said gaseous mixtures with a first moving bed of granular charcoal to adsorb more readily adsorbable constituents leaving hydrogen sulfide and $C_3$ hydrocarbons and less readily adsorbable constituents unadsorbed, contacting the unadsorbed gas with a second moving bed of charcoal to adsorb hydrogen sulfide and $C_3$ hydrocarbons leaving less readily adsorbable constituents substantially unadsorbed, desorbing hydrogen sulfide and $C_3$ hydrocarbons from said second moving bed of charcoal, contacting the thus desorbed gas with an aqueous solution of diethanolamine thereby extracting hydrogen sulfide and leaving said $C_2$ hydrocarbons unextracted, combining said methane with said $C_3$ hydrocarbons, and recovering hydrogen sulfide in a state of high purity from said aqueous solution.

13. A process for separating a gaseous mixture containing nitrogen, carbon dioxide, hydrogen sulfide and hydrocarbon gases which comprises contacting said gaseous mixture with a first moving bed of solid granular adsorbent to adsorb $C_3$ hydrocarbon, hydrogen sulfide and more readily adsorbable constituents leaving less readily adsorbable constituents as an unadsorbed gas, contacting said unadsorbed gas separated from said first moving bed with a second moving bed of adsorbent to adsorb $C_2$ hydrocarbon and carbon dioxide leaving less readily adsorbable constituents as a second unadsorbed gas, contacting the second unadsorbed gas substantially free of $C_2$ and higher molecular weight hydrocarbons separated from said second moving bed with a third moving bed of adsorbent to adsorb $C_1$ hydrocarbon from nitrogen and less readily adsorbable constituents in the absence of $C_2$ and higher molecular weight hydrocarbons, separating nitrogen as a substantially unadsorbed lean gas product from said third moving bed, desorbing methane therefrom as a product gas, combining said first and second moving beds of adsorbent, desorbing $C_3$ hydrocarbons and hydrogen sulfide and some more readily adsorbable constituents from the combined adsorbent, passing the thus desorbed gases through said second moving bed forming a second side cut gas product containing $C_3$ hydrocarbons and hydrogen sulfide and thereby desorbing $C_2$ hydrocarbons and carbon dioxide as a first side cut gas product, subsequently desorbing the most readily adsorbable gases from said combined adsorbent as a product gas, separately extracting carbon dioxide and hydrogen sulfide respectively from said first and second side cut product gases by contact thereof with aqueous solutions of diethanolamine leaving substantially pure $C_2$ and $C_3$ hydrocarbon product gases respectively and recovering carbon dioxide and hydrogen sulfide from said diethanolamine solutions.

14. A process for the recovery of substantially pure nitrogen, carbon dioxide, and hydrogen sulfide from natural gas which comprises contacting said natural gas with a first moving bed of solid granular adsorbent to adsorb hydrogen sulfide and $C_3$ hydrocarbons and more readily adsorbable constituents thereof leaving carbon dioxide and $C_2$ hydrocarbons and less readily adsorbable constituents as a substantially unadsorbed secondary feed gas, subsequently contacting said secondary feed gas with a second moving bed of solid granular adsorbent in the absence of $C_3$ and higher molecular weight hydrocarbons to adsorb carbon dioxide and $C_2$ hydrocarbons leaving nitrogen and methane substantially unadsorbed, contacting the unadsorbed nitrogen and methane with a third moving bed of adsorbent thereby adsorbing methane leaving nitrogen substantially pure and unadsorbed as a product gas, desorbing adsorbed methane from said third moving bed of adsorbent, contacting said second moving bed of adsorbent with a reflux gas containing $C_3$ hydrocarbons to preferentially desorb a mixture of carbon dioxide and $C_2$ hydrocarbons as a first side cut gas, extracting carbon dioxide from said $C_2$ hydrocarbons therein by contact with an alkaline solvent, recovering substantially pure carbon dioxide from said alkaline solvent, subsequently desorbing a mixture of hydrogen sulfide and $C_3$ hydrocarbons from the second moving bed as a second side cut gas product, extracting hydrogen sulfide from said $C_3$ hydrocarbons therein by contact with an alkaline solvent, recovering substantially pure hydrogen sulfide from said alkaline solvent, and recirculating said moving beds of adsorbent to contact further quantities of the gaseous mixtures.

15. In a process for the separation of hydrocarbon gas mixtures containing inorganic constituents obtained in natural gas field cycling operations wherein a gas is removed from an output well, treated for recovery of desirable constituents, and the remaining gas is returned to the producing formation through an injection well, the improvement which comprises establishing a first selective adsorption zone containing a first and a second separation zone, establishing a second selective adsorption zone, passing a first and second moving bed of solid granular adsorbent, respectively, through said first and second separation zones in said first selective adsorption zone, passing a third moving bed of solid granular adsorbent through said second selective adsorption zone, introducing said hydrocarbon gas mixture containing nitrogen, carbon dioxide and hydrogen sulfide from said output well into said first separation zone wherein $C_4$ hydrocarbons and more readily adsorbable constituents are adsorbed on said first moving bed leaving $C_3$ hydrocarbons, carbon dioxide, hydrogen sulfide, nitrogen and less readily adsorbable constituents as a substantially unadsorbed secondary feed gas, removing said secondary feed from said first separation zone and introducing it into said second separation zone wherein $C_1$ hydrocarbon, nitrogen and less readily adsorbable constituents remain substantially unadsorbed as a first lean gas substantially free of $C_2$ and higher molecular weight hydrocarbons and the $C_2$ and $C_3$ hydrocarbons and carbon dioxide and hydrogen sulfide are adsorbed on said second moving bed forming a second rich adsorbent, contacting said second rich adsorbent first with a $C_3$ hydrocarbon and hydrogen sulfide reflux to desorb $C_2$ hydrocarbons and carbon dioxide as a first side cut gas product, subsequently contacting said second rich adsorbent with a $C_4$ hydrocarbon reflux gas to desorb $C_3$ hydrocarbons and hydrogen sulfide as a second side cut gas product, removing said first and second side cut gas products separately from said second separation zone, introducing said first lean gas into said second selective adsorption zone, contacting said first lean gas therein with said third moving bed of solid granular adsorbent to adsorb methane in the absence of $C_2$ and higher molecular weight hydrocarbons forming a third rich adsorbent leaving less readily adsorbable inorganic constituents substantially unadsorbed, subsequently desorbing the adsorbed methane from said third rich adsorbent in said second selective adsorption zone, separating carbon dioxide constituents from said first side cut gas product by extraction with an alkaline solvent leaving $C_2$ hydrocarbons unextracted, extracting the hydrogen sulfide from said second side cut gas product, combining the carbon dioxide and hydrogen sulfide thus recovered with said nitrogen, combining $C_2$ hydrocarbons thus formed with methane recovered from said second selective adsorption zone and recycling the gas mixture thus formed to said injection well for reintroduction into the gas producing formation.

16. A process according to claim 15 wherein said alkaline solvent comprises an aqueous solution of diethanolamine.

17. In a process for the separation of hydrocarbon gas mixtures containing inorganic constituents obtained in natural gas field cycling operations wherein a gas is removed from an output well, treated for recovery of desirable constituents, and the remaining gas is returned to the producing formation through an injection well, the improvement which comprises establishing a first selective adsorption zone containing a first and a second separation zone, establishing a second selective adsorption zone, passing a first and second moving bed of solid granular adsorbent, respectively, through said first and second separation zones in said first selective adsorption zone, passing a third moving bed of solid granular adsorbent through said second selective adsorption zone, introducing said output well into said first separation zone gen, carbon dioxide and hydrogen sulfide from said hydrocarbon gas mixture containing nitrowherein $C_4$ hydrocarbons and more readily adsorbable constituents are adsorbed on said first moving bed leaving $C_3$ hydrocarbons, carbon dioxide, hydrogen sulfide, nitrogen and less readily adsorbable constituents as a substantially unadsorbed secondary feed gas, removing said secondary feed from said first separation zone and introducing it into said second separation zone wherein $C_1$ hydrocarbon, nitrogen and less readily adsorbable constituents remain substantially unadsorbed as a first lean gas substantially free of $C_2$ and higher molecular weight hydrocarbons and the $C_2$ and $C_3$ hydrocarbons and carbon dioxide and hydrogen sulfide are adsorbed on said second moving bed forming a second rich adsorbent, contacting said adsorbent first with a $C_3$ hydrocarbon and hydrogen sulfide reflux to desorb $C_2$ hydrocarbons and carbon dioxide as a first side cut gas product, subsequently contacting the second rich adsorbent with a $C_4$ hydrocarbon reflux gas to desorb $C_3$ hydrocarbons and hydrogen sulfide as a second side cut gas product, removing said first and second side cut gas products separately from said second separation zone, introducing said first lean gas into said second selective adsorption zone, contacting said first lean gas therein with said third moving bed of solid granular adsorbent in said second adsorption zone to adsorb methane in the absence of $C_2$ and higher molecular weight hydrocarbons forming a third rich adsorbent leaving nitrogen and less readily adsorbable inorganic constituents substantially unadsorbed, subsequently desorbing the adsorbed methane from said third rich adsorbent in said second selective adsorption zone, separating carbon dioxide from said first side cut gas product by extraction with an alkaline solvent leaving $C_2$ hydrocarbons unextracted, extracting the hydrogen sulfide from said second side cut gas product, recovering the carbon dioxide and hydrogen sulfide from the solvents, and recycling methane thus separated in said second selective adsorption zone to said injection well for reintroduction into the gas producing formation.

18. A process for the separation of hydrocarbon gas mixtures containing nitrogen, carbon dioxide and hydrogen sulfide as inorganic constituents obtained in natural gas production operations which comprises establishing a first selective adsorption zone containing a first and a second separation zone, establishing a second selective adsorption zone, passing a first and second moving bed of solid granular adsorbent, respectively, through said first and second separation zones in said first selective adsorption zone, passing a third moving bed of solid granular adsorbent through said second selective adsorption zone, introducing said hydrocarbon gas mixture into said first separation zone wherein $C_3$ hydrocarbons, hydrogen sulfide and more readily adsorbable constituents are adsorbed on said first moving bed leaving $C_2$ hydrocarbons, carbon dioxide, nitrogen and less readily adsorbable constituents as a substantially unadsorbed secondary feed gas, removing said secondary feed from said first separation zone and introducing it into said second separation zone wherein $C_1$ hydrocarbon, nitrogen and less readily adsorbable constituents remain substantially unadsorbed as a first lean gas substantially free of $C_2$ and higher molecular weight hydrocarbons and the $C_2$ hydrocarbons and carbon dioxide are adsorbed on said second moving bed forming a second rich adsorbent, contacting said adsorbent first with a $C_3$ hydrocarbon and hydrogen sulfide reflux to desorb $C_2$ hydrocarbons and carbon dioxide as a first side cut gas product, combining said first and second moving beds of adsorbent, contacting the combined adsorbent with a reflux gas containing $C_4$ hydrocarbons thereby desorbing a gas containing $C_3$ hydrocarbons and hydrogen sulfide and contaminated with $C_4$ hydrocarbons, subsequently contacting the second rich adsorbent with the thus desorbed gas to adsorb $C_4$ and more readily adsorbable hydrocarbons leaving $C_3$ hydrocarbons and hydrogen sulfide as an unadsorbed second side cut gas product, desorbing $C_4$ and more readily adsorbable hydrocarbons from the combined beds of adsorbent leaving a lean adsorbent, removing said first and second side cut gas products separately from said second separation zone, introducing said first lean gas into said second selective adsorption zone, contacting said first lean gas therein with said third moving bed of solid granular adsorbent to adsorb methane in the absence of $C_2$ and higher molecular weight hydrocarbons forming a third rich adsorbent leaving nitrogen and any less readily adsorbable constituents substantially unadsorbed, subsequently desorbing the adsorbed methane from said third rich adsorbent, separating inorganic constituents from said first side cut gas product by extraction with an alkaline solvent leaving $C_2$ hydrocarbons unextracted, extracting the hydrogen sulfide from said second side cut gas product leaving $C_3$ hydrocarbons unextracted, and recovering substantially pure streams of carbon dioxide and hydrogen sulfide from said alkaline solvents.

19. A process according to claim 18 in combination with the steps of removing a part of the lean solid granular adsorbent prior to passage through said first selective adsorption zone, heating the thus removed adsorbent indirectly to temperatures of the order of 1000–1100° F., contacting the thus heated adsorbent countercurrently with steam to desorb residual $C_4$ and higher molecular weight hydrocarbons forming a reactivated adsorbent and combining the reactivated adsorbent with the recirculating stream thereof passing through said first selective adsorption zone.

20. A process according to claim 19 in combination with the step of periodically raising the temperature to which the adsorbent is heated to temperatures of the order of 1700–1800° F., contacting the thus heated adsorbent with steam to effect a preferential water-gas reaction with residual undesorbed hydrocarbons for a sufficient period of time to increase the adsorbent capacity of the adsorbent and subsequently lowering the temperature to which the adsorbent is heated to temperatures of the order of 1000–1100° F. to desorb further quantities of residual $C_4$ and higher molecular weight hydrocarbons.

CLYDE H. O. BERG.

REFERENCES CITED

The following references are of record in the file of this patent:

UNITED STATES PATENTS

| Number | Name | Date |
|---|---|---|
| Re. 18,958 | Bottoms | Sept. 26, 1933 |
| 1,422,007 | Soddy | July 4, 1922 |
| 1,825,707 | Wagner | Oct. 6, 1931 |
| 2,135,319 | Bays | Nov. 1, 1938 |
| 2,376,425 | Frey | May 22, 1945 |
| 2,384,311 | Kearby | Sept. 4, 1945 |

OTHER REFERENCES

"Textbook of Phys. Chem.," Glastone, 6th Ptg., p. 1175, Van Nostrand.

"Natural Gas," Garner, vol. 5, No. 11, Nov. 1924, pp. 3, 4, 46, 48, and 50.